Patented Jan. 20, 1931

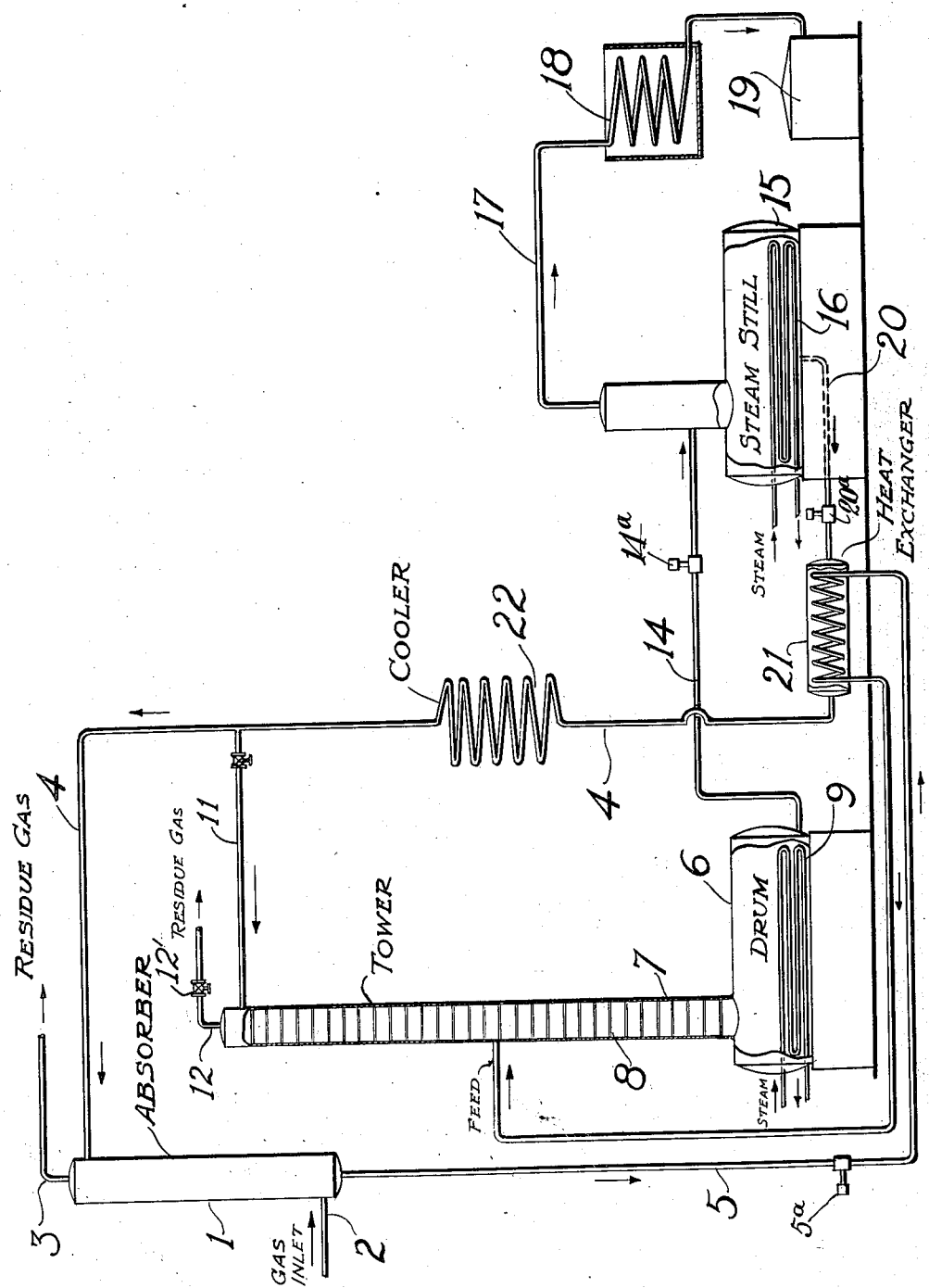

1,789,470

UNITED STATES PATENT OFFICE

NATHANIEL E. LOOMIS, OF WESTFIELD, NEW JERSEY, ASSIGNOR TO STANDARD OIL DEVELOPMENT COMPANY, A CORPORATION OF DELAWARE

PROCESS AND APPARATUS FOR RECOVERING GASOLINE FROM GAS

Application filed November 25, 1925. Serial No. 71,413.

This invention relates to the art of recovering condensible constituents from hydrocarbon gases. The invention will be fully understood from the following description, taken in connection with the accompanying drawing, in which the figure is a diagrammatic elevation of one form of apparatus suitable for carrying out the process.

Referring to the drawing, reference numeral 1 denotes an absorption or gas-scrubbing tower, which may be of any approved type. A pipe 2, opening into the lower portion of the tower, serves for the introduction of gas from which condensible constituents are to be removed. A pipe 3 conveys residual gas from the tower. Absorption oil is introduced into the upper part of the tower through pipe 4. The absorption stock (oil containing components abstracted from the gas) is withdrawn through pipe 5 connected at the lower portion of the tower. A pump 5a is connected with pipe 5.

It is well known in the art that the absorption stock contains not only gasoline fractions but a large amount of dissolved fixed gas. This is especially true when the absorber is run under pressure, as is common practice. An attempt is usually made to free the absorption stock from the dissolved gas by leading it through a "vent tank" in which the pressure is released. This practice, however, neither completely frees the absorber stock of gas nor prevents the escape of desirable gasoline constituents. As a result, it is generally necessary to treat again this vented gas for further gasoline recovery.

By the present invention the gaseous fractions are substantially completely removed from the absorption stock, and at the same time the gas that is driven off is prevented from carrying with it any material amount of desirable gasoline constituents. This is accomplished by means of the equipment and procedure now to be described.

A still 6 having a rectifying or fractionating tower 7 receives the absorption stock. In accordance with this invention, the absorption stock is introduced into an intermediate portion of the tower 7, and the constituents carried thereby are rectified in the presence of the absorption oil. The rectifying tower preferably has a relatively large number of gas and liquid contact plates 8 of any suitable type. Bell-cap plates may be advantageously used. The still 6 is heated by a steam coil 9, or other appropriate means, to a temperature sufficient partially to vaporize the lowest boiling constituent that it is desired to retain in the absorption stock, thereby expelling substantially all the light undesired material from the oil, but permitting the retention of gasoline constituents.

The absorption stock is preferably preheated, as subsequently described. Heat may be applied in the lower portion of the tower 7, for example by heating coils in the tower, or by withdrawing a portion of the oil, heating it, and returning it to the tower.

Relatively cool fresh absorption oil is introduced through pipe 11 in amount sufficient to absorb or condense substantially all the desired hydrocarbons, while allowing gases and very light vapors to escape. By the use of the absorption oil in this manner I am able to retain the desired constituents in the tower without recourse to the cooling under high pressure that would be necessary in the absence of such oil. However, some cooling by coils, or the like, in the tower is not precluded.

A pipe 12 serves for the withdrawal of unabsorbed gases and vapors from the top of the tower 7. Such gases and vapors may be passed to storage, or other suitable disposition. A pressure-regulating valve 12' may be installed in the pipe 12.

The oil containing gasoline constituents and substantially free from gas is withdrawn from still 6 through a pipe 14, in which there is a pump 14a, to a steam still 15, wherein it is heated by a steam coil 16, or other suitable means. Gasoline constituents are evolved and taken off overhead through pipe 17 to condenser 18 and receiver 19. The residual oil in still 15 is forwarded through pipe 20, in which there is a pump 20a, to a heat exchanger 21, which may be utilized to heat the charged oil passing to the fractionating tower 7, and thence through pipe 4, in which a cooler 22 is arranged, to the absorption tower 1.

As illustrative of the operation of my process, the following example is given: Natural gas, still gas, or the like, is cooled if necessary and passed into the absorption tower 1 into which a suitable absorption liquid is introduced through pipe 4. Such liquid is preferably a hydrocarbon oil miscible with the condensible constituents of the gas and substantially non-volatile under the conditions imposed. Mineral seal oil, gas oil, heavy naphtha, or similar hydrocarbons are suitable. While absorption oils of greater volatility may be used, they impose an unnecessary burden upon the system by introducing vaporizable components.

The absorption stock is preheated in heat exchanger 21 and fed into the rectifying tower 7 which may have, for example, 30 plates, the oil entering just above the 15th plate. About 30 lbs. absolute pressure is maintained in the tower 7. Gas is liberated, due to the preheating of the oil. The oil descends through the tower to the bottom still or drum 6 where it is heated to about 260° F. The gas and vapor evolved flow upward countercurrent to the absorption stock. Vapors are reabsorbed or condensed with an accompanying liberation of lighter vapors carried by the absorption stock. This action continues progressively up the tower. Light hydrocarbons (methane, ethane, etc.) are substantially excluded from the absorption stock in the still, which nevertheless retains the desired amount of butane and the heavier gasoline constituents. Some propane may be allowed to remain in the final product, if desired.

In the upper half of the tower the rising gas and vapor are washed by a stream of fresh absorption oil introduced through pipe 11. Heavier constituents are in part rectified in the upper portion of the tower and are then carried down with such oil to the lower rectification zone. The process going on in tower 7 may be aptly described as "absorptive rectification", in distinction to prior rectification processes in which no absorption oil is present.

The charged oil from the still 6 is passed to steam still 15 and heated therein to a temperature at which the gasoline constituents are evolved. The stripped absorption oil is cooled in heat exchanger 21 and cooler 22 and is then returned to the absorption tower 7. The process is preferably operated continuously, but one or more of the operations may be conducted intermittently, if desired.

In accordance with my invention, a gasoline is produced which is substantially free from gas and "wild" vapors but contains a desirable percentage of the butane content of the gas, as well as substantially all the heavier gasoline constituents. In addition, the gas taken off from the top of the rectifying tower 7 is "dry", that is, substantially free from condensible gasoline constituents. The gas from the absorption tower 1 is also dry.

The details of structure and procedure as given above may be varied considerably within the scope of the appended claims, in which it is my intention to claim all novelty inherent in the invention, as broadly as the prior art permits.

I claim:

1. Process of rectifying constituents derived from a hydrocarbon gas, comprising absorbing such constituents in a liquid miscible therewith and substantially nonvolatile under the conditions imposed, passing the charged absorption liquid into and downward through a vapor and liquid contact zone, heating the lower portion of such zone, flowing downward through the upper portion of such zone a second relatively cool liquid substantially nonvolatile under the conditions imposed and adapted to absorb components less volatile than propane desired to be retained in the tower and withdrawing the vapors.

2. Process according to claim 1, in which the charged absorption liquid is introduced into an intermediate portion of the vapor and liquid contact zone.

3. Process according to claim 1, in which the charged absorption liquid is preheated before entering the vapor and liquid contact zone.

4. Apparatus for recovery of condensable constituents from natural gas and the like, comprising means for bringing the gas and an absorption liquid into intimate contact, a tower having gas and liquid contact means throughout an intermediate portion, a heating zone at the lower portion, a cooling zone at the upper portion thereof, a pipe for introducing the charged absorption oil into an intermediate portion of the tower, means for passing uncharged absorption oil into the upper portion of the tower, means for taking off residual gas and absorption oil containing the desired product, a stripping still, a connection for passing the absorption oil containing the desired product to the still, and means for passing the stripped oil from the still in indirect heat exchange with the absorption stock passing to the tower.

NATHANIEL E. LOOMIS.